United States Patent
Watson

(10) Patent No.: US 11,334,246 B2
(45) Date of Patent: May 17, 2022

(54) NANOSERVICES—A PROGRAMMING DESIGN PATTERN FOR MANAGING THE STATE OF FINE-GRAINED OBJECT INSTANCES

(71) Applicant: EMC IP HOLDING COMPANY LLC, Hopkinton, MA (US)

(72) Inventor: Thomas Watson, Richardson, TX (US)

(73) Assignee: Dell Products L.P., Hopkinton, MA (US)

( * ) Notice: Subject to any disclaimer, the term of this patent is extended or adjusted under 35 U.S.C. 154(b) by 117 days.

(21) Appl. No.: 16/840,872

(22) Filed: Apr. 6, 2020

(65) Prior Publication Data

US 2021/0311632 A1    Oct. 7, 2021

(51) Int. Cl.
*G06F 3/00*    (2006.01)
*G06F 3/06*    (2006.01)

(52) U.S. Cl.
CPC .......... *G06F 3/0605* (2013.01); *G06F 3/0655* (2013.01); *G06F 3/0689* (2013.01)

(58) Field of Classification Search
CPC ..... G06F 3/0606; G06F 3/0655; G06F 3/0689
See application file for complete search history.

(56) References Cited

U.S. PATENT DOCUMENTS

| 2015/0280959 A1* | 10/2015 | Vincent | G06F 3/0622 |
| | | | 709/203 |
| 2018/0027079 A1* | 1/2018 | Ben Ali | H04L 67/16 |
| | | | 709/216 |
| 2019/0253520 A1* | 8/2019 | Maharana | H04L 67/327 |

\* cited by examiner

*Primary Examiner* — Craig S Goldschmidt
(74) *Attorney, Agent, or Firm* — Anderson Gorecki LLP

(57) ABSTRACT

Subscriber-managed nanoservices enable the states of multiple instances of an object to be contemporaneously updated without requiring an object-wide mutex or per-instance dedicated threads. A separate subscriber-managed nanoservice is implemented for each object instance. Each subscriber-managed nanoservice includes a first function that adds requests to update state of an object instance to a FIFO queue and provides a lock to only one subscriber thread at a time. Each subscriber-managed nanoservice includes a second function that combines queued requests and performs object instance state updates response to calls from the lock-holding subscriber thread. Each subscriber-managed nanoservice functions independently so multiple instances of an object can be contemporaneously updated. Further, it is not necessary to have a dedicated thread for management of each object instance because the subscriber threads call the functions.

20 Claims, 5 Drawing Sheets

NANOSERVICES—A PROGRAMMING DESIGN PATTERN FOR MANAGING THE STATE OF FINE-GRAINED OBJECT INSTANCES

TECHNICAL FIELD

The subject matter of this disclosure is generally related to software, and more particularly to managing the state of fine-grained object instances such as instances of storage-related objects in a data storage system.

BACKGROUND

A data center may include a cluster of host servers that run host applications. The host applications may run in containers and be deployed and un-deployed by a container orchestration system. Examples of container orchestration systems that are currently commercially available include Amazon EC2 Container Service (ECS), Docker Platform, Kubernetes, and Helios. An external storage system or storage array such as a storage area network (SAN) may be used to maintain host application data. Instances of the host applications may be frequently deployed and undeployed by the container orchestration system. Moreover, some of the host application instances may be deployed for a relatively short period of time. Consequently, management of the state of associated storage virtualization objects of the external storage system may be burdensome.

SUMMARY

All examples, aspects, and features mentioned in this document can be combined in any technically possible way.

In a data storage system in which host applications are deployed and un-deployed to containers by a container orchestration system and host application data is maintained by storage-related objects of a storage node, a method for managing state of one of the storage-related objects in accordance with some implementations comprises: implementing a separate subscriber-managed nanoservice for each instance of the storage-related object; each subscriber-managed nanoservice responding to calls to a first function by ones of a plurality of subscriber threads initiated by the container orchestration system by adding a request to update state of the storage related object to an input stream and providing a lock to only a first one of the subscriber threads; and each subscriber-managed nanoservice responding to calls to a second function by ones of the plurality of subscriber threads holding the lock by performing object instance state updates as indicated in the requests added to the input stream. Some implementations comprise implementing the input stream as a first-in, first-out queue. Some implementations comprise implementing the input stream as a channel. Some implementations comprise the first function returning update status for each request in a separate error channel within the input stream channel. In some implementations providing the lock comprises implementing a Boolean channel with a Boolean value indicative of lock status. Some implementations comprise the second function combining a plurality of the requests into a single request. Some implementations comprise the second function releasing the lock.

An apparatus in accordance with some implementations comprises: a container orchestration system comprising a driver with a separate subscriber-managed nanoservice for each instance of a storage-related object, wherein each subscriber-managed nanoservice is responsive to calls to a first function by ones of a plurality of subscriber threads initiated by the container orchestration system to add a request to update state of the storage-related object to an input stream and provide a lock to only a first one of the subscriber threads; and wherein each subscriber-managed nanoservice is responsive to calls to a second function by ones of the plurality of subscriber threads holding the lock to perform object instance state updates as indicated in the requests added to the input stream. In some implementations the input stream comprises a first-in, first-out queue. In some implementations the input stream comprises a channel. In some implementations the first function returns update status for each request in a separate error channel within the input stream channel. In some implementations the lock comprises a Boolean channel with a Boolean value indicative of lock status. In some implementations the second function combines a plurality of the requests into a single request. In some implementations the second function releases the lock.

Some implementations comprise a computer-readable storage medium storing instructions that when executed by a computer cause the computer to perform a method for using a computer system to update object instance state in a system comprising a plurality of instances of an object, the method comprising: implementing a separate subscriber-managed nanoservice for each instance of the storage-related object; each subscriber-managed nanoservice responding to calls to a first function by ones of a plurality of subscriber threads initiated by the container orchestration system by adding a request to an input stream to update the state of the storage-related object and providing a lock to only a first one of the subscriber threads; and each subscriber-managed nanoservice responding to calls to a second function by ones of the plurality of subscriber threads holding the lock by performing object instance state updates as indicated in the requests added to the input stream. Some implementations comprise implementing the input stream as a channel. Some implementations comprise the first function returning update status for each request in a separate error channel within the input stream channel. In some implementations providing the lock comprises implementing a Boolean channel with a Boolean data type indicative of lock status. Some implementations comprise the second function combining a plurality of the requests into a single request. Some implementations comprise the second function releasing the lock.

Other aspects, features, and implementations may become apparent in view of the detailed description and figures.

DETAILED DESCRIPTION

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer.

Aspects of the inventive concepts are described in the context of management of storage group state in a data center that includes a container orchestration system, host servers, and a storage array. However, the invention is not limited to that context. Those of ordinary skill in the art will recognize that there are a wide variety of implementations of the inventive concepts in view of the teachings of the present disclosure.

Some aspects, features, and implementations described herein may include machines such as computers, electronic components, optical components, and processes that include computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
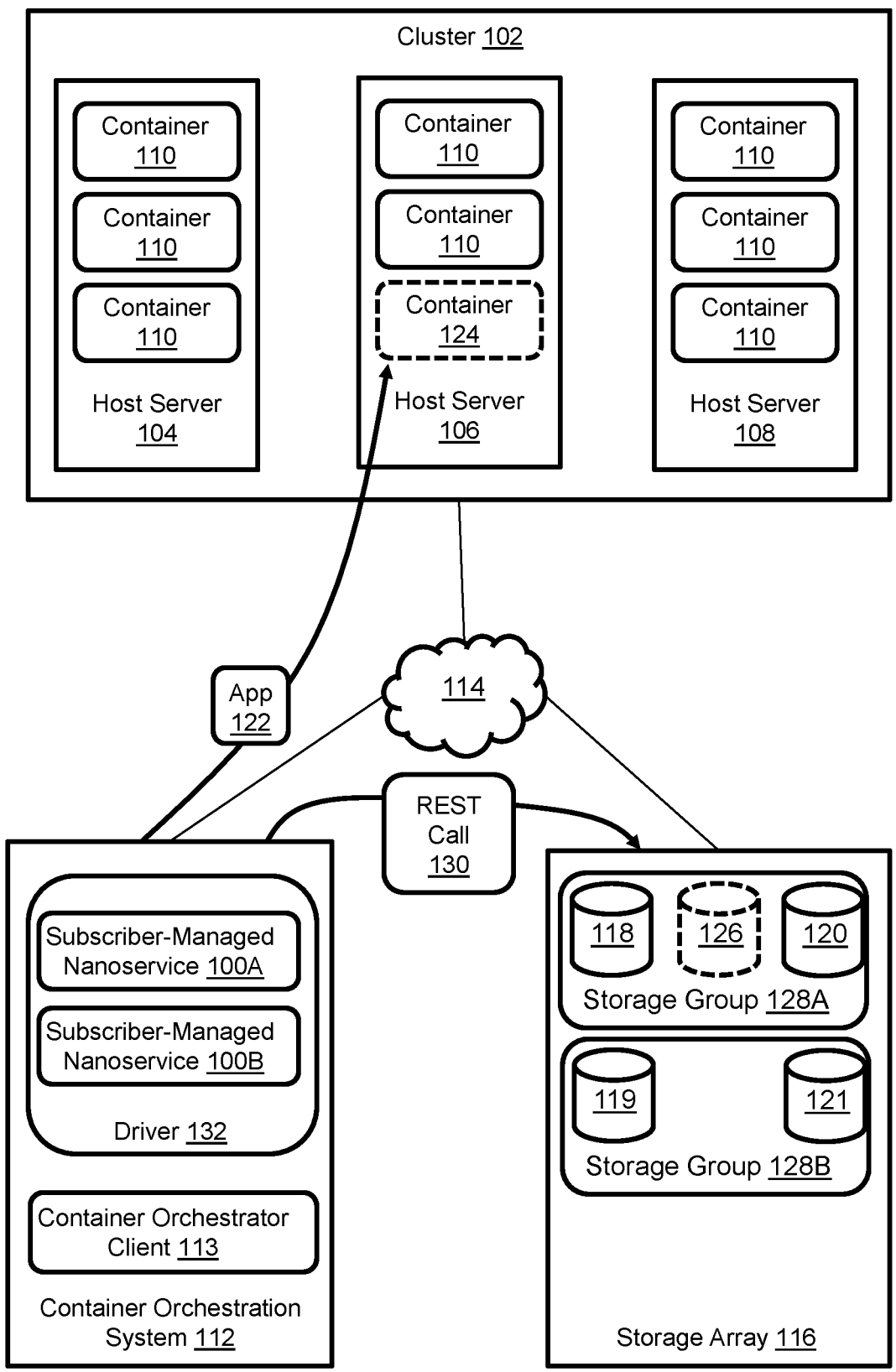
FIG. 1 illustrates a data center in which subscriber-managed nanoservices are used to manage the state of storage-related object instances such as storage groups.

FIG. 1 illustrates a data center in which subscriber-managed nanoservices 100A, 100B (collectively 100) help to manage the state of storage-related object instances such as storage groups 128A, 128B (collectively 128). The data center, which is simplified for practical reasons, includes a cluster 102 of host servers 104, 106, 108. Each host server is a physical computing node that includes CPUs, volatile memory such as random-access memory (RAM) of any type, and non-volatile storage such as solid-state drives (SSDs) and hard disk drives (HDDs). The host servers run instances of host applications that perform various business processes. Each host application instance runs inside an associated container 110, and there may be multiple containers and host application instances contemporaneously in operation on a single host server.

Host application instances are deployed to containers by a container orchestration system 112 that is connected with the host servers via a network 114. The container orchestration system 112 includes client software 113 running on a physical computing node that includes CPUs, volatile memory, and non-volatile storage. In addition to deploying application instances, the container orchestration system may cause host application instances to be un-deployed from the containers, in which case the associated container is terminated. The container orchestrator client 113 calls a driver 132 with a request to provision or deprovision storage for host application instanced being deployed and un-deployed. Each call to the driver causes a thread to be created within the driver to process the request. The data used by deployed host application instances, which is referred to as "host application data," is maintained by a storage array 116 or other type of external storage system. The host application data may be maintained by the storage array on logical production volumes such as production volumes 118, 119, 120, and 121. Different host applications and host application instances may use different production volumes, and multiple production volumes may be organized into a storage group such as storage group 128A, which contains production volumes 118 and 120 and storage group 128B, which contains production volumes 119 and 121.

A new container 124 is created when the container orchestration system 112 deploys a new instance of a host application 122, e.g. on host server 106. Further, a production volume 126 is provisioned to that host server 106. In order to provision the production volume 126 to the host server 106 a new production volume may be created and added to one of the storage groups, or an existing production volume may be added to one of the storage groups. This may be accomplished by sending a representational state transfer (REST) call 130 from the container orchestration system 112 to the storage array 116. The REST call may be generated by a driver 132 of which the subscriber-managed nanoservices 100 are a part. When the container orchestration system un-deploys the application instance 122 from the container 124 the production volume 126 may be un-provisioned from the host server 106 and deleted or removed from the storage group 128A. Consequently, the state of a storage groups changes when application instances are deployed and un-deployed by the container orchestration system 112. Problematically, storage group state may require frequent update because the storage array may simultaneously support many instances of storage groups, e.g. hundreds or thousands, and host application instances may be frequently deployed and undeployed and remain deployed for only a relatively short period of time.

The subscriber-managed nanoservices 100 manage storage group state. A nanoservice is generally smaller than a microservice and performs a single narrower service. A separate subscriber-managed nanoservice is implemented for each managed object instance, e.g. for each storage group object instance on the storage array. In the illustrated example subscriber-managed nanoservice 100A manages state for storage group 128A and subscriber-managed nanoservice 100B manages state for storage group 128B. Each subscriber-managed nanoservice uses requesting (subscriber) threads to perform operations that prompt update of the state of the storage groups. The requesting threads may be threads that deploy applications and generate corresponding REST calls. Subscriber-managed nanoservices will be described in greater detail below following discussion of some of the storage-related objects of the storage array.

Figure 2:
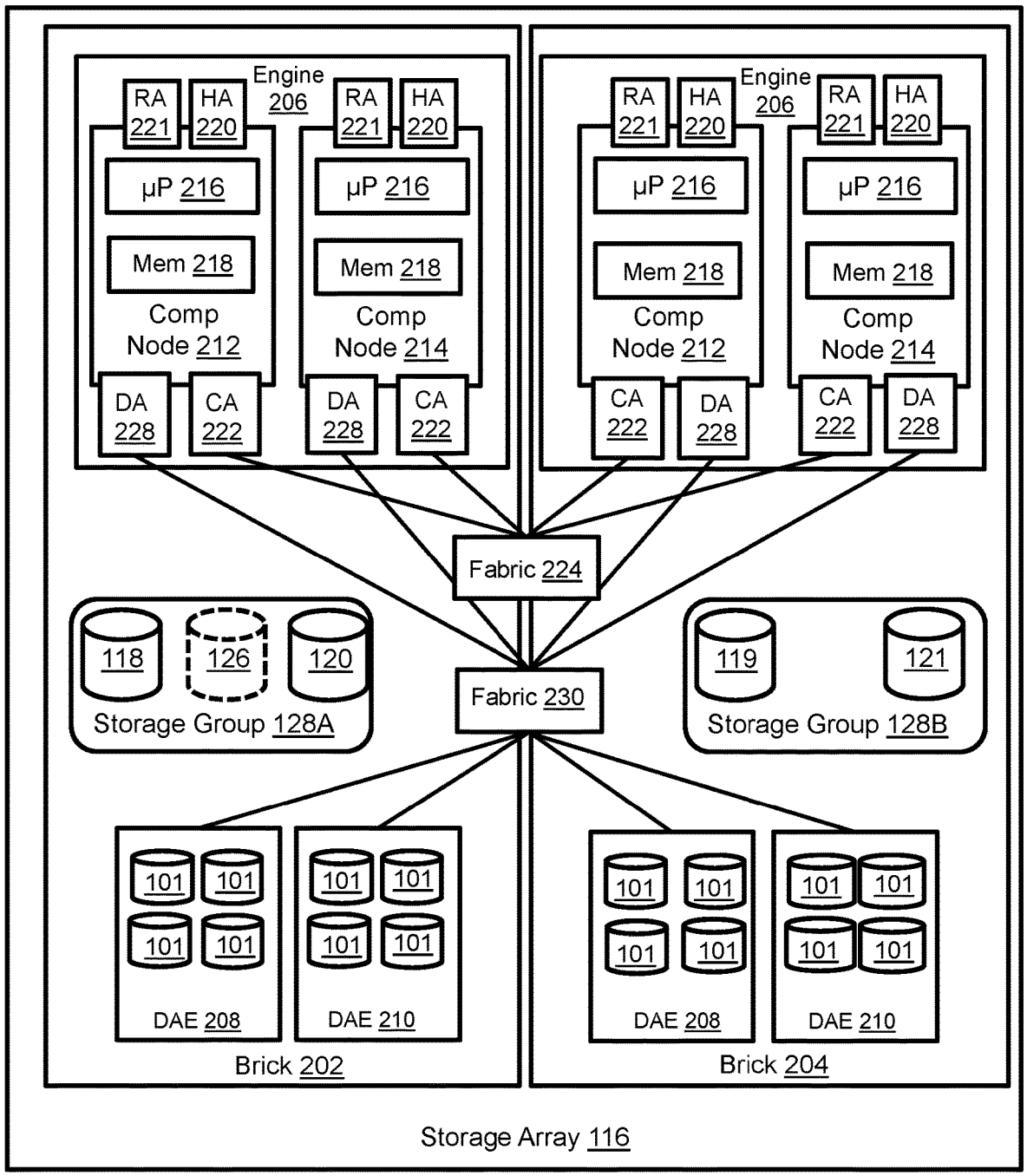
FIG. 2 illustrates the storage array in greater detail.

FIG. 2 illustrates the storage array 116 in greater detail. The storage array includes one or more bricks 202, 204, each of which includes an engine 206 and one or more drive array enclosures (DAEs) 208, 210. Each DAE includes managed drives 101 of one or more technology types. Examples may include, without limitation, SSDs such as flash and HDDs with spinning disk storage media. Each engine 206 includes a pair of interconnected computing nodes 212, 214, which may be referred to as "storage directors." Each computing node includes resources such as at least one multi-core processor 216 and local memory 218. The processor 216 may include central processing units (CPUs), graphics processing units (GPUs), or both. The local memory 218 may include volatile memory such as dynamic random-access memory (DRAM), non-volatile memory (NVM) such as storage class memory (SCM), or both. Each computing node includes one or more host adapters (HAs) 220 for communicating with the host servers. Each host adapter has resources for servicing input-output commands (IOs) from the host servers. The resources may include processors, volatile memory, and ports via which the host servers may access the storage array. Each computing node also includes a remote adapter (RA) 221 for communicating with other storage systems. Each computing node also includes one or more drive adapters (DAs) 228 for communicating with the managed drives 101 in the DAEs. Each drive adapter has processors, volatile memory, and ports via which the computing node may access the DAEs for servicing IOs. Each computing node may also include one or more channel adapters (CAs) 222 for communicating with other computing nodes via an interconnecting fabric 224. Each computing node may allocate a portion or partition of its respective local memory 218 to a shared memory that can be accessed by other computing nodes, e.g. via direct memory access (DMA) or remote DMA (RDMA). The paired computing nodes 212, 214 of each engine 206 provide failover protection and may be directly interconnected by communication links. An interconnecting fabric 230 enables implementation of an M-way active-active backend. A backend connection group includes all drive adapters that can access the same drive or drives. In some implementations every drive adapter 228 in the storage array can reach every DAE via the fabric 230. Further, in some implementations every drive adapter in the storage array can access every managed drive 101 in the storage array.

Data associated with instances of the host applications running on the host servers is maintained on the managed drives 101. The managed drives 101 are not discoverable by the host servers so the storage array 116 creates the logical production volumes 118, 119, 120, 121, 126 that can be discovered and accessed by the host servers. From the perspective of the host servers, each production volume is a single drive having a set of contiguous fixed-size logical block addresses (LBAs) on which data used by the host application resides. However, the host application data is stored at non-contiguous addresses on various managed drives 101.

Figure 3:
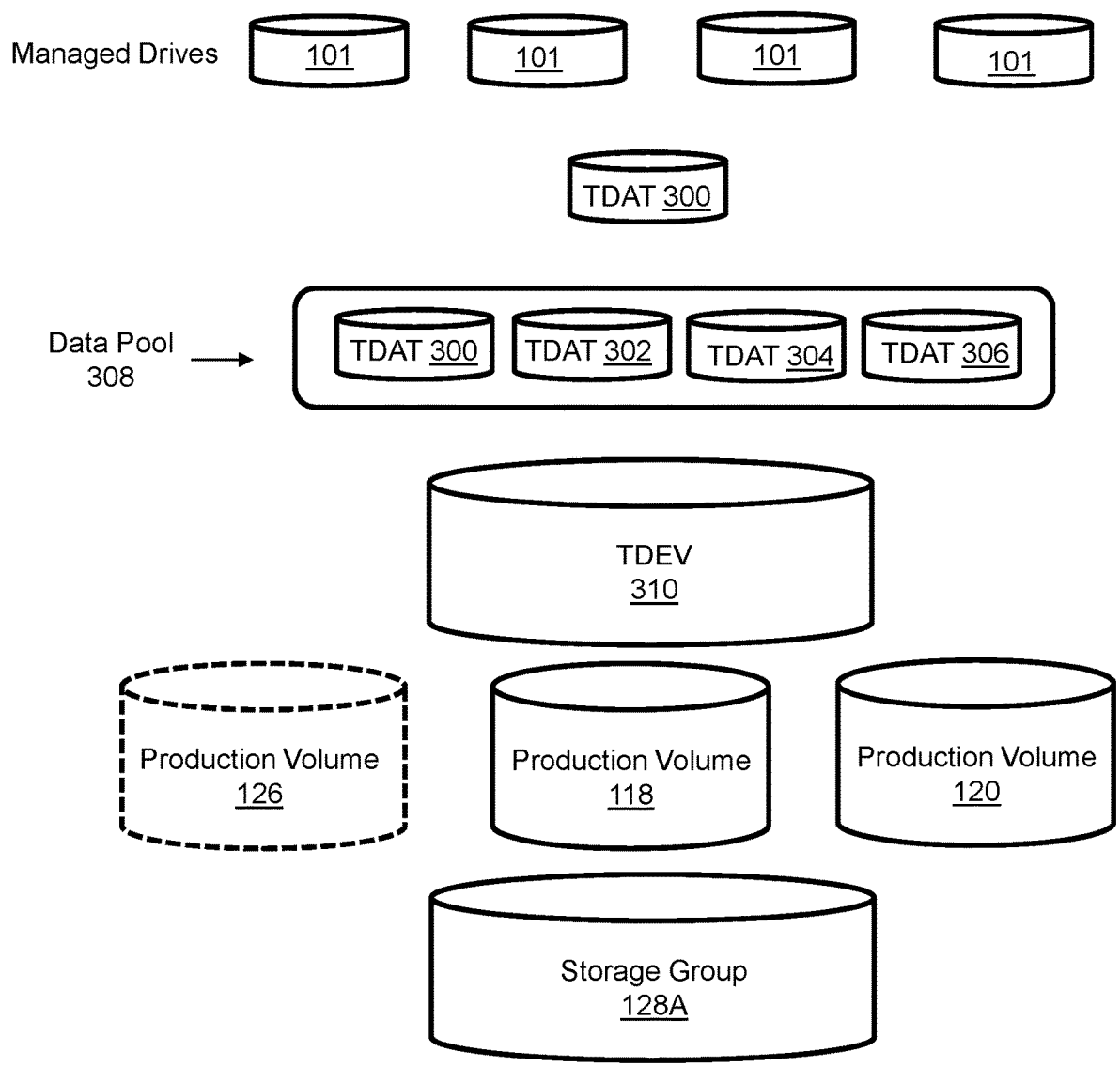
FIG. 3 illustrates storage virtualization objects of the storage array.

FIG. 3 illustrates some of the storage virtualization objects of the storage array. Multiple layers of abstraction exist between the managed drives 101 and the production volumes 118, 120, 126. A set of the managed drives is used to create a logical data device (TDAT) 300. A data pool 308, also known as a thin pool, is a collection of TDATs 300, 302, 304, 306 of the same emulation and RAID protection type. In some implementations, all TDATs in a drive group are of a single RAID protection type and all are the same size. Logical thin devices (TDEVs) such as TDEV 310 are created with the TDATs. The logical production volumes 118, 120, 126 are created from TDEVs. The storage group 128A is a logical construct that includes selected production volumes 118, 120, 126. Each logical construct and logical device may be represented as an object with a state that can be managed with a nanoservice. For example, each production volume may be an object instance of a production volume class.

Figure 4:
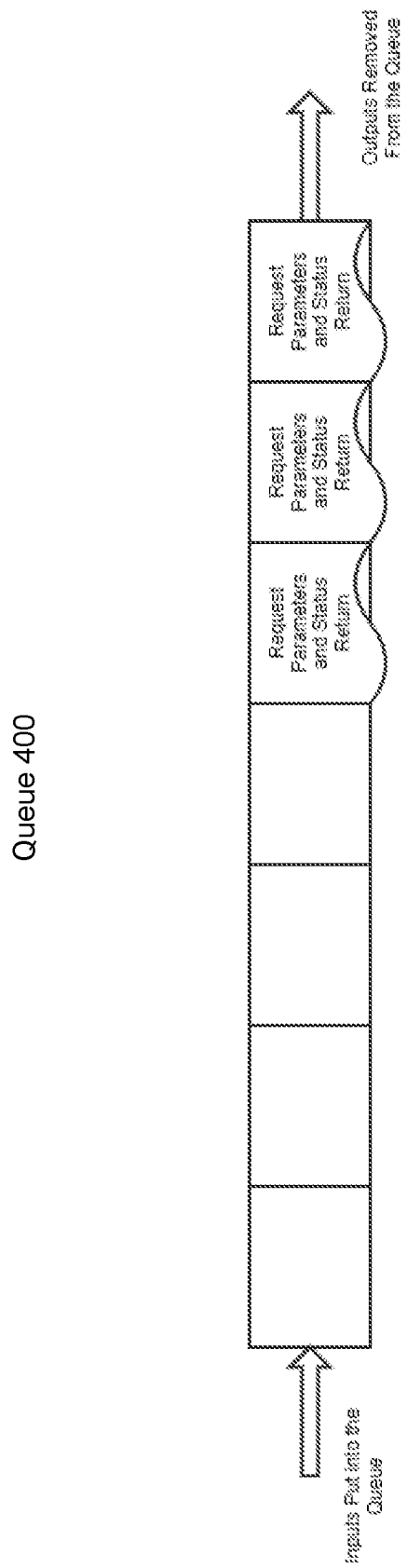
FIG. 4 illustrates a channel for managing the state of a storage group.

Referring to FIGS. 1 and 4, each nanoservice 100A, 100B has an input stream such as a queue 400 to receive requests from multiple subscriber threads. The queue may be configured with first-in, first-out (FIFO) functionality, e.g. using a buffered channel in the Go language. Subscriber threads prompt generation of requests to update storage group state. Each request contains all the parameters necessary for processing the request. For example, each request for adding or removing a production volume from a storage group may include a storage array identifier, a production volume identifier, and identifiers for a masking view and/or the storage group to be updated. Each request may also include a handle that allows the nanoservice to return completion status (e.g., no error, or the error code or message) to the subscriber thread, as will be discussed below.

Figure 5:
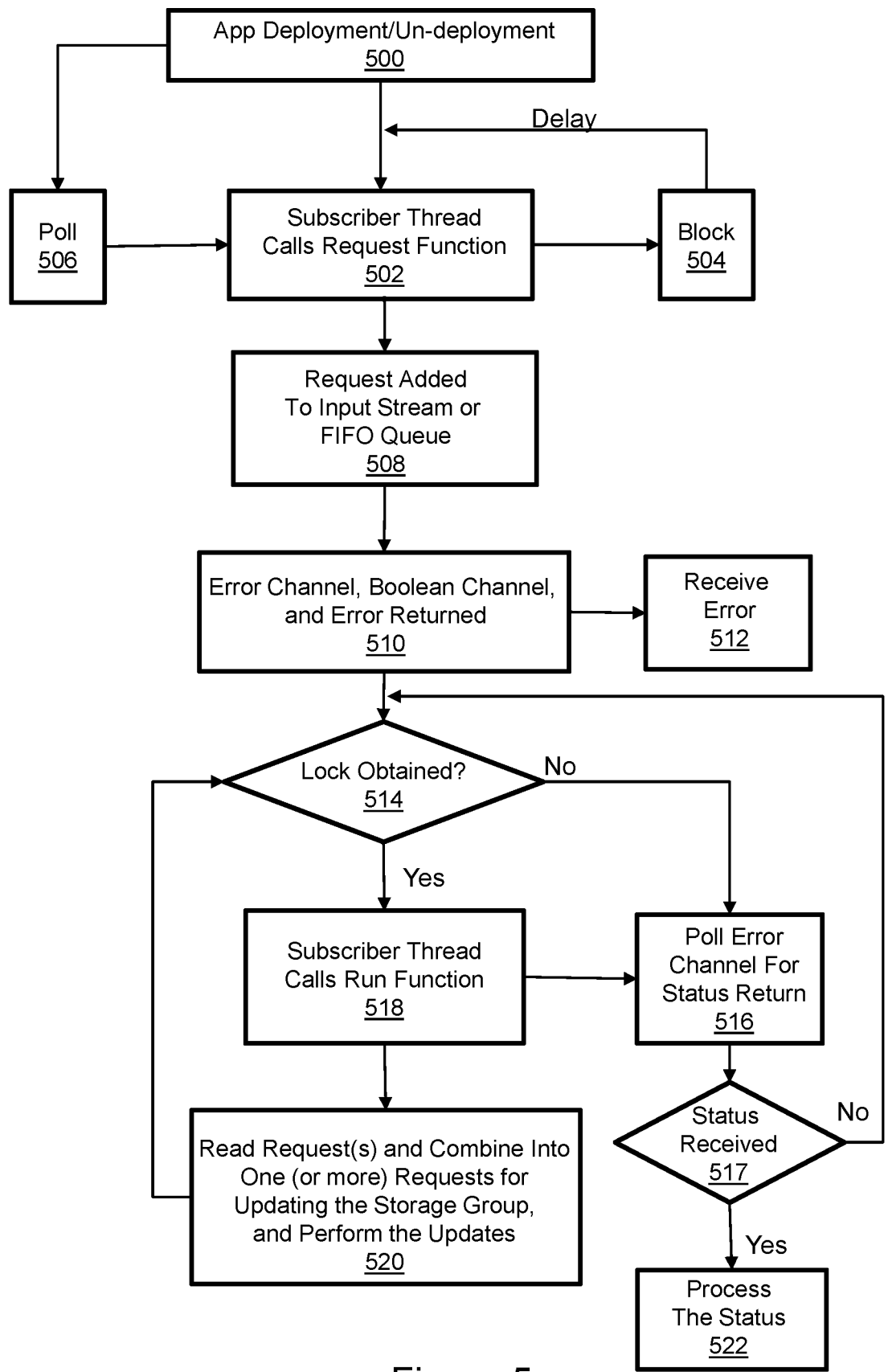
FIG. 5 illustrates operation of the subscriber-managed nanoservices.

FIG. 5 illustrates operation of one of the subscriber-managed nanoservices. The illustrated process begins with the deployment or un-deployment of a host application creating a need to provision or un-provision a production volume as indicated in step 500. In order to provision or un-provisional the production volume a subscriber thread calls a request function that generates a request as indicated in step 502. For example, func (g *storageGroupSvc) requestRemoveVolumeFromSG(tgtStorageGroupID, tgt-MaskingViewID, reqID, symID, devID string) (chan error, chan bool, error) puts a request in an input stream such as a FIFO queue implemented as a channel as indicated in step 508. The request function returns an error channel, a Boolean channel, and error as a result as indicated in step 510. The error channel is an output stream that provides the result of processing the request. In other words, rather than having a single output stream for the entire nanoservice there is an individual output stream in each request, which the nanoservice uses to return any status needed by the subscriber thread that made the request. After the nanoservice function processes a request, it sends the status back to that specific request's output stream, which is implemented as a channel, i.e. an error channel. The Boolean channel is a lock channel as will be described in greater detail below. An error is returned if for some reason the request cannot be queued as indicated in step 512.

Subscriber threads will normally block if the channel is full of existing requests as indicated in step 504. In the event of a block the request function may be called again after a delay. A channel may be polled to determine whether it is possible to send to or receive from the channel without blocking as indicated in step 506. In the Go language the polling mechanism is called select, and it enables the subscriber thread to determine if it is possible to send or receive from one or more channels, or if no channels are ready for writing or reading, to process a default clause, similar to a switch statement. The syntax is as follows:

```
for done := false; !done; {
  select {
  case err = <-waitChan:
    if err != nil {
      log.Printf("Received error %s on waitChan %v reqID %s", err, waitChan, reqID)
    }
    close(waitChan)
    done = true
  case <-lockChan:
    // We own the lock, and should process the service
    s.sgSvc.runRemoveVolumesFromSG(symID, tgtStorageGroupID)
  default:
    // Hang out waiting on completion or our turn to run the service
    time.Sleep(50 * time.Millisecond)
  }
}
```

In the select clause above it is possible to receive from the waitChan channel, receive from the lockChan channel, or take the default path.

The Boolean lock channel is used by subscriber threads to obtain a lock that determines whether to call a run function, e.g. runRemoveVolumesFromSG. The Boolean channel has a queue depth of one and holds a Boolean value, e.g. "true." If the Boolean value is present in the Boolean channel, then the channel lock is in the unlocked state. If a subscriber thread receives from the Boolean channel and gets the Boolean value "true" then that subscriber thread has obtained the lock. The Boolean channel is then emptied (the true value is removed), thereby indicating that the channel lock is in the locked state. Other subscriber threads that attempt to receive from the Boolean channel while the lock is held will not be able to receive from the Boolean channel. When it is time to release the lock, the Boolean value "true" is written back to the channel and the channel lock thereby becomes "unlocked" again. If the lock is not obtained as determined in step 514 then the subscriber thread polls the error channel for status return as indicated in step 516. When the status is received as determined in step 517, it is processed as indicated in step 522, e.g. returning either a success or failure indicator to the request's originator.

If the lock is obtained as determined in step 514 then the subscriber thread calls a run function as indicated in step 518, e.g., func (g *storageGroupSvc) runRemoveVolumesFromSG(symID, tgtStorageGroupID string). The run function reads one or more requests from the nanoservice input stream, combines those requests into one (or more) requests for updating the storage group state, and performs the updates as indicated in step 520, e.g., generating REST calls that are sent to the storage array. The run function returns nothing. Error statuses are returned via the error channels as indicated in step 516. Because the run function is only called by the one subscriber thread at a time that holds the Boolean channel lock for that nanoservice, there is never more than one subscriber thread processing the state of the same storage group. The run function releases the Boolean channel lock by writing to the Boolean channel just before returning.

The subscriber thread code may be as follows:

```
1276      waitChan, lockChan, err :=
s.sgSvc.requestRemoveVolumeFromSG(tgtStorageGroupID, tgtMaskingViewID, reqID,
symID, devID)
1277   if err != nil {
1278      log.Error(err)
1279   }
1280   log.Printf("reqID %s devID %s waitChan %v lockChan %v", reqID, devID,
waitChan, lockChan)
1281
1282   for done := false; !done; {
1283      select {
1284      case err = <-waitChan:
1285         if err != nil {
1286            log.Printf("Received error %s on waitChan %v reqID %s", err,
waitChan, reqID)
1287         }
1288         close(waitChan)
1289         done = true
1290      case <-lockChan:
1291         // We own the lock, and should process the service
1292         s.sgSvc.runRemoveVolumesFromSG(symID, tgtStorageGroupID)
1293      default:
1294         // Hang out waiting on completion or our turn to run the service
1295         time.Sleep(50 * time.Millisecond)
1296      }
1297   }
```

On line 1276, the subscriber thread requests service. The subscriber thread receives back a waitChan to receive any error indication processing the request, a lockChan to indicate receipt of the nanoservice lock and duty to call the run function, and an err if the request cannot be queued. The subscriber thread then polls to receive either a status from the waitChan on line 1284, or the lockChan on line 1290, or if neither then the subscriber thread sleeps for a period before polling again (line 1295). If status is received from the waitChan, then the subscriber thread's request is done. If the Boolean is received from the lockChan, it is the subscriber thread's duty to call the run function (runRemoveVolumesFromSG) and process requests on behalf of the nanoservice. The subscriber thread is not aware of the logic required to run the nanoservice other than the need to call the run function. The run function automatically releases the lock when it completes just before it returns, so that if/when there is additional work to do, a different subscriber thread can receive the lock from the lockChan and call the run function.

An alternative technique for managing the state of the storage groups is to use a microservice. A microservice breaks what might be implemented as a monolithic application into a collection of individual, smaller, loosely coupled services. A storage group management microservice could implement a mutex to allow temporally exclusive access such that only one thread at a time can manipulate the state of any storage group. However, a simple mutex does not provide fairness because ordering of operations is not prioritized. Moreover, significant delays may be created when many requesting threads contend for a mutex to all storage groups collectively due to the large number of storage groups, frequent deployment/un-deployment of host applications, and the amount of time required to manipulate storage group state.

A technique for reducing the delays described above is to implement thread-managed nanoservices. A thread-managed nanoservice for management of storage group object state includes a separate dedicated thread for each storage group object instance. Each thread-managed nanoservice may implement locks to prevent conflicts between requests that update the storage group object instance. Advantageously, the state of multiple storage groups can be contemporaneously updated. However, dedicated threads require resources such as memory and many dedicated threads may be required because there may be many storage groups. Moreover, the state of some storage groups may change infrequently so the resource cost of infrequently used dedicated threads may not justify the advantage.

In contrast with the alternative techniques described above, the subscriber-managed nanoservices manages storage group state by using the requesting threads to perform operations that update the state of the storage group. A separate subscriber-managed nanoservice is implemented for each storage group, i.e. for each storage group object instance. Consequently, the state of multiple storage groups can be contemporaneously updated without the need for a pool of per-object instance dedicated threads for management of state for each storage group. Because each nanoservice has a separate FIFO input queue, for any given storage group the requests are processed in FIFO order with minimal waiting in the queue. Moreover, congestion on one nanoservice does not impact the wait times for updates of nanoservices of other storage groups. Once a subscriber thread is executing the run function, the code is unencumbered in that it can combine multiple input requests into a single update of the storage group, on behalf of multiple subscribers, making the updating process more efficient. Further, the code for the subscriber-managed nanoservices is isolated and has well defined entry points (request and run functions). These and other aspects may provide advantages over alternative techniques.

Specific examples have been presented to provide context and convey inventive concepts. The specific examples are not to be considered as limiting. Although batching requests to add or remove volumes to or from storage groups has been used to provide context, the invention could be applied to other storage virtualization objects and a wide variety of other applications, e.g. where for some reason it is advantageous to consider multiple requests at a time. One example of this would be optimizing delivery routes in real time to consider groups of destination addresses to define an optimal route. It should therefore be understood that a wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. In a data storage system in which host applications are deployed and un-deployed to containers by a container orchestration system and host application data is logically stored on storage group object instances that each include a plurality of logical production volume object instances representative of non-volatile storage of a storage node, wherein each production volume object instance is associated with a different host application instance, a method for managing state, comprising:
implementing a separate subscriber-managed nanoservice for each storage group object instance;
each subscriber-managed nanoservice responding to calls to a first function by ones of a plurality of subscriber threads initiated by the container orchestration system by adding a request to an input stream to update the state of the storage related a corresponding one of the storage group object instances and providing a lock to only a first one of the subscriber threads; and
each subscriber-managed nanoservice responding to calls to a second function by ones of the plurality of subscriber threads holding the lock by performing object instance state updates of the corresponding one of the storage group object instances as indicated in the requests added to the input stream.

2. The method of claim 1 comprising implementing the input stream as a first-in, first-out queue.

3. The method of claim 1 comprising implementing the input stream as a channel.

4. The method of claim 3 comprising the first function returning update status for each request in a separate error channel output stream.

5. The method of claim 1 wherein providing the lock comprises implementing a Boolean channel with a Boolean value indicative of lock status.

6. The method of claim 1 comprising the second function combining a plurality of the requests into a single request.

7. The method of claim 1 comprising the second function releasing the lock.

8. An apparatus comprising:
a container orchestration system comprising a driver with a separate subscriber-managed nanoservice for each instance of a plurality of storage group object instances that each include a plurality of logical production volume object instances representative of non-volatile storage, wherein each production volume object instance is associated with a different host application instance,
wherein each subscriber-managed nanoservice is responsive to calls to a first function by ones of a plurality of subscriber threads initiated by the container orchestration system to add a request to update state of a corresponding one of the storage group object instances to an input stream and provide a lock to only a first one of the subscriber threads; and
wherein each subscriber-managed nanoservice is responsive to calls to a second function by ones of the plurality of subscriber threads holding the lock to perform state updates of the corresponding one of the storage group object instances as indicated in the requests added to the input stream.

9. The apparatus of claim 8 wherein the input stream comprises a first-in, first-out queue.

10. The apparatus of claim 8 wherein the input stream comprises a channel.

11. The apparatus of claim 10 wherein the first function returns update status for each request in a separate error channel output stream.

12. The apparatus of claim 8 wherein the lock comprises a Boolean channel with a Boolean value indicative of lock status.

13. The apparatus of claim 8 wherein the second function combines a plurality of the requests into a single request.

14. The apparatus of claim 8 wherein the second function releases the lock.

15. A non-transitory computer-readable storage medium storing instructions that when executed by a computer cause the computer to perform a method for using a computer system to update object instance state in a system comprising a plurality of storage group object instances that each include a plurality of logical production volume object instances representative of non-volatile storage, wherein each production volume object instance is associated with a different host application instance, the method comprising:
implementing a separate subscriber-managed nanoservice for each storage group object instance;
each subscriber-managed nanoservice responding to calls to a first function by ones of a plurality of subscriber threads initiated by the container orchestration system by adding a request to an input stream to update state of a corresponding one of the storage group object instances and providing a lock to only a first one of the subscriber threads; and
each subscriber-managed nanoservice responding to calls to a second function by ones of the plurality of subscriber threads holding the lock by performing state updates of the corresponding one of the storage group object instances as indicated in the requests added to the input stream.

16. The non-transitory computer-readable storage medium of claim 15 wherein the method further comprises implementing the input stream as a channel.

17. The non-transitory computer-readable storage medium of claim 16 wherein the method further comprises the first function returning update status for each request in a separate error channel output stream.

18. The non-transitory computer-readable storage medium of claim 15 wherein providing the lock comprises implementing a Boolean channel with a Boolean data type indicative of lock status.

19. The non-transitory computer-readable storage medium of claim 15 wherein the method further comprises the second function combining a plurality of the requests into a single request.

20. The non-transitory computer-readable storage medium of claim 15 wherein the method further comprises the second function releasing the lock.

* * * * *